United States Patent [19]

Albrecht

[11] Patent Number: 4,865,050

[45] Date of Patent: Sep. 12, 1989

[54] METHOD AND APPARATUS FOR GATHERING OF HOP VINES

[75] Inventor: Zbyněk Albrecht, Prostějov, Czechoslovakia

[73] Assignee: Agrozet, Brno, Czechoslovakia

[21] Appl. No.: 176,493

[22] Filed: Apr. 1, 1988

[30] Foreign Application Priority Data

Apr. 1, 1987 [CS] Czechoslovakia ............... 2273-87

[51] Int. Cl.[4] .................................... A01D 46/02
[52] U.S. Cl. ................................ 460/126; 56/14.5
[58] Field of Search ................ 130/30 R, 30 D; 56/14.5, 16.5, 16.6

[56] References Cited

U.S. PATENT DOCUMENTS 2,685,773  8/1954  Dauenhauer ............... 130/30 D

FOREIGN PATENT DOCUMENTS 2446707  4/1975  Fed. Rep. of Germany ... 130/30 D
1782210  10/1979  Fed. Rep. of Germany .
1271433  11/1986  U.S.S.R. ...................... 130/30 D Primary Examiner—Stephen J. Novosad
Assistant Examiner—David J. Bagnell
Attorney, Agent, or Firm—Klein & Vibber

[57] ABSTRACT

In order to increase the efficiency of a harvesting line of hop vines and in order to eliminate hard work, the transfer of hop vines is controlled starting from their cutting in the hop garden up to their feeding to a picking machine. In order to increase the reliability of functioning, the hop vines are always consecutively seized at a hitherto not damaged place of the stalk. A displaceable rotary storage device can be alternately connected to a trailing device, to a conveying device and to an intermediate storage device provided in front of a dosing conveyer of a picking machine.

9 Claims, 5 Drawing Sheets

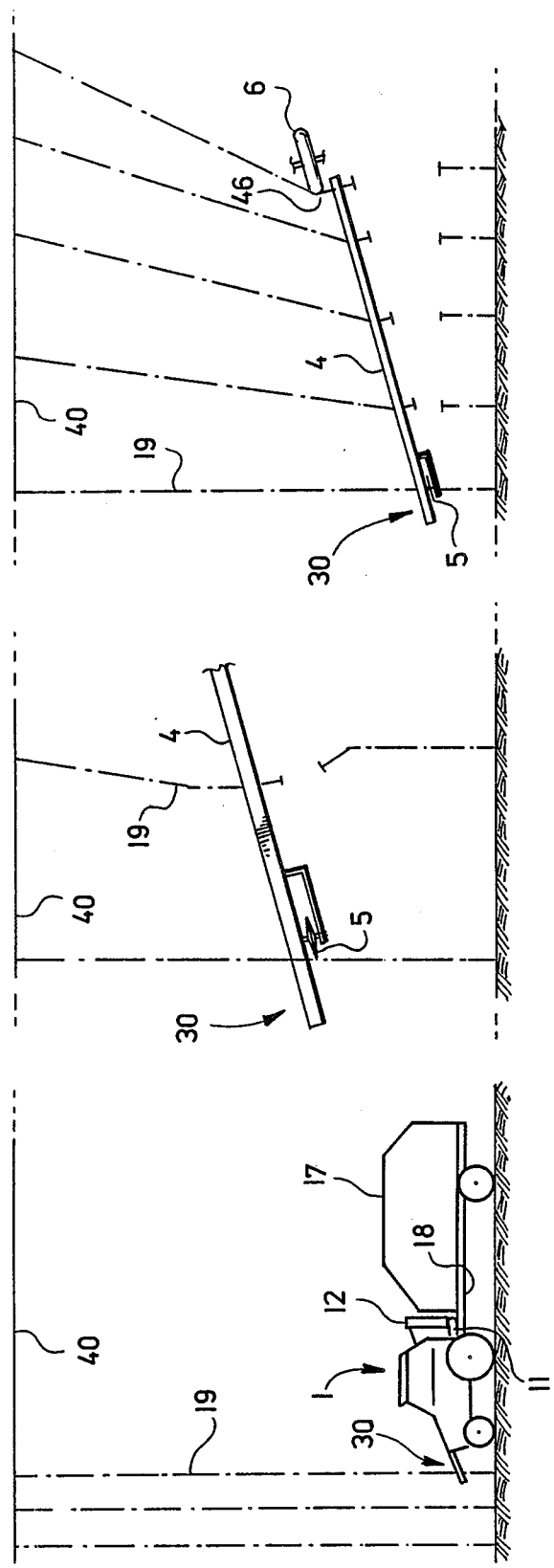

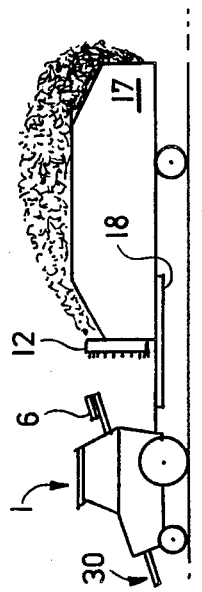
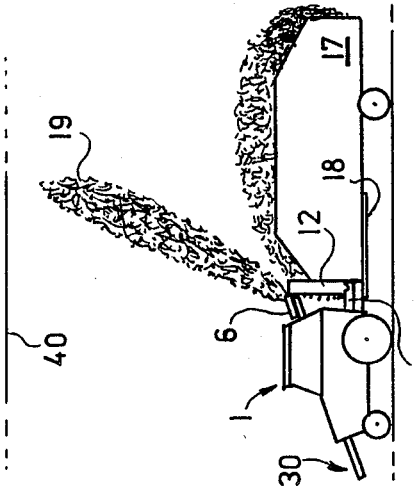
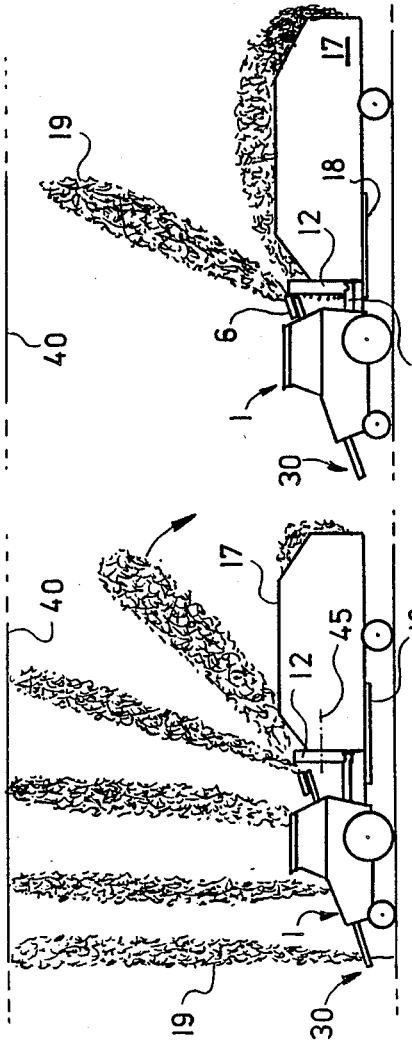
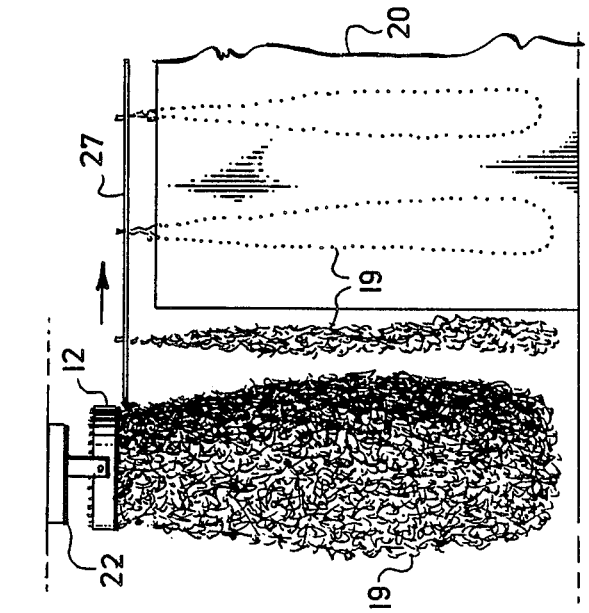
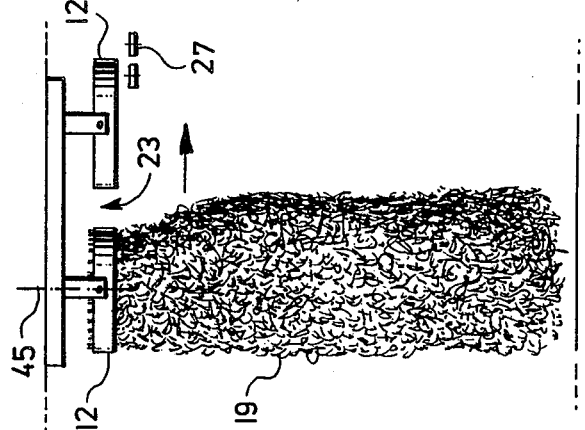
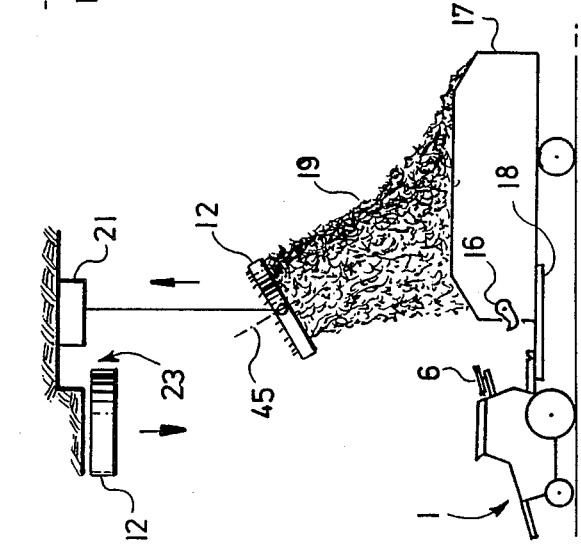

METHOD AND APPARATUS FOR GATHERING OF HOP VINES

FIELD OF THE INVENTION

The invention relates to a method for gathering of hop vines, the lower ends of which are cut off from their roots, are seized by an inclined conveyer and engaged by a tear-off conveyer and subsequently stored in a conveying device to be conveyed to a picking machine. The invention also relates to an apparatus for execution of this method comprising a trailing device provided with a cutting device, an inclined conveyor and a conveying device for transferring the hop vines to a dosing conveyer of a picking machine.

BACKGROUND OF THE INVENTION

The gathering of hop vines and their transfer to a picking machine has been up to now mostly performed by a manual tearing off of vines, storage on simple conveying means, transfer on simple transfer means and by a manual suspending in order to be taken over directly from said transport means by a feeding track of a processing line. This kind of gathering is rather demanding of manual labor. Moreover, this labor is very frequently performed under adverse conditions, is physically demanding, particularly if the hop vines are torn off in the course of unfavorable weather, and requires a monotonous manual, physically demanding suspension of vines to be fed to a stationary processing line.

Other drawbacks of the known method are: the relatively long idle time intervals of conveying means, the necessity of changing of driving means (of tractors) and the increased danger of working accidents of attendants engaged therewith.

A method for cutting and tearing off of hop vines using an arrangement supported on a tractor is also known, where the hop vines are automatically cut off and torn off and thereafter are placed on some conveying means. The hop vines are, however, stored on the conveying means in a rather maladjusted manner. In case of application of a similar method and apparatus, the work required from the attendants caring for conveying means is relatively reduced, but the demanding manual labor in connection with the suspension of vines which have to be fed to a stationary processing line is not eliminated.

In apparatus using simple conveying means, the drawbacks due to idle time intervals of those conveying means prevail and the increased risk in connection with the changing of conveying means is also not eliminated.

Methods and apparatuses comprising conveying means with a discharge conveyer are also known where the hop vine can be mechanically removed from the conveying means so that the idle time interval of similar combined conveying means on the working site where the suspending of hop vines takes place is reduced.

A drawback of similar solutions is, however, the relatively increased damage of the product in the course of transfer and further drawbacks originating therefrom.

In case of a manual feeding of vines to the processing line, the vines are individually suspended on simple devices which transfer and feed the vines directly to a picking machine without the possibility of any accumulation. The efficiency of similar lines depends directly on the instantaneous efficiency of attendants at the working site where the suspension is performed. At more efficient processing lines the vines are individually suspended at an automatic conveying track providing also a certain possibility of accumulation of vines prior to being processed in the proper picking machine. Thus, the efficiency and smoothness of work of the whole processing line are increased. A drawback of known arrangements of similar tracks is, however, a substantially higher requirement in manufacturing and a limited possibility of accumulation of vines in front of the picking machine.

A common drawback of all actually known methods and apparatuses is the high requirement of human labor for suspension of vines prior to being supplied to the processing line and the dependence of the working time required for suspension on the quality and the conditions of the gathered product and simultaneously also the dependence on the quality of the manual or automatic work in connection with introduction of vines to the conveying means.

SUMMARY OF THE INVENTION

It is an object of this invention to eliminate or at least to reduce the mentioned drawbacks of known methods and apparatuses and particularly to reduce substantially the requirement of human labor for tearing off, transfer and particularly suspension prior to feeding the hop vines to stationary processing lines, reduction of idle time intervals of conveying means in front of the picking machine, increased accumulation of vines in front of the picking machine and reduction of loss and damage to gathered hop vines.

According to this invention, the hop vines are, from their cutting off up to their introduction into the picking machine, retained at a place on the stalk which remains up to this time undamaged, which place is somewhat distant from the place where the vine has been cut off. After tearing off, the vines are seized by a displaceable rotary storage device which imparts to the seized hop vines the shape of a bundle of a longitudinal helix which bundle is, after transfer to the picking machine, displaced to a vertical position whereafter the hop vines are, by the rotary displaceable storage device, subsequently released, taken over by a dosing conveyer, and supplied to the picking machine.

It is advantageous from the point of view of a smooth performance of gathering and in order to secure the automation of its realization to proceed with the method and with the apparatus according to this invention under conditions where the distances at which the hop vines are cut off from their roots up to the moment of their seizure by a rotary displaceable storage device are smaller in each following stage of their processing as compared to the preceeding stage. However, at the stage of their passage through the dosing conveyer, these distances are larger than at the stage of their seizure by the displaceable rotary storage device. It is also advantageous where the ratio of speeds of hop vines in the displaceable rotary storage device against the speed in the inclined conveyer and in the tear off conveyer are adjustable and furthermore where the ratio of speed of hop vines in the displaceable rotary storage device to their speed in the dosing conveyer is adjustable.

The apparatus for execution of the method according to this invention comprises a trailing device supporting an inclined conveyer. The trailing device is adapted for fastening and driving a displaceable rotary storage device of hop vines. A conveying device is provided for fastening of said displaceable rotary storage device in a horizontal position of its axis and, in front of a dosing conveyer, an intermediate storage device is provided adapted for fastening of at least one displaceable rotary storage device in a vertical discharge position, alternately also in a receiving position and in a position for its removal and also for its agitation.

In order to achieve a reliable performance of gathering of hop vines and a reduction of their damaging and of losses, a solution is advantageous where the inlets of the tear-off conveyor and the outlet of the displaceable rotary storage device are above the level of the outlet of the conveyer arranged in front of them and the inlet part of the dosing conveyer at the intermediate storage device is below the level of the outlet of the displaceable rotary storage device.

Another feature which equally influences favourably a careful handling of hop vines, the saving of working forces and an easy manipulation is providing the trailing device with clamping means for fastening the displaceable rotary storage device and with a driving element for its drive. The conveying device is also provided with retaining means for fastening the displaceable rotary storage device and with a driving outlet for its drive.

From the point of view of optimization of working conditions in the course of gathering, a solution according to this invention is also advantageous where the inclined conveyor is mounted on the trailing device so as to enable its horizontal and vertical adjustment. It is also advantageous if the front part of the inclined conveyer is in mechanical engagement with a hoisting device of the trailing device and if a hydraulic cylinder is inserted between the front part of the inclined conveyer and the trailing device.

The method and apparatus according to this invention secures the achievement of a high quality of the gathered substrate, a smooth operation of the processing line and reduces substantially the requirement of physically demanding human work in the course of gathering. By elimination of the necessity of changing trailing means, the working safety of attendants of the processing line is improved.

The provision of an intermediate storage device in front of the proper picking machine secures a higher possibility of accumulation and equalization in case of variations of efficiency of the mobile and stationary part of the line and influences favourably the smooth working of the whole line.

The automatic dosing of vines into the picking machine takes place according to this invention exactly in the opposite direction than the introduction of vines into the displaceable rotary storage device, which secures a smooth and careful removal of hop vines and their smooth dosing into the picking machine without regard to the kind and habitus of the gathered hop.

The arrangement of a displaceable storage device according to this invention and the vertical position of vines in the bundle in the intermediate storage device secures in addition to the accumulation possibility, i e., the creation of a certain spare amount of vines, also conditions for a favorable mutual position of vines at relatively low requirements of space near the picking machine and creates conditions for a reduction of required floor space of the processing line.

The method and apparatus according to this invention provides favourable conditions for a careful handling of the hop vine, so that at all stages of harvesting no damages or losses of the product occur. It simultaneously secures that the gathered product does not come in contact with the soil or with other undesirable organic or inorganic substances. Thus also a high quality of the obtained product is achieved.

The method and apparatus according to this invention secures that the attendants need not perform physically demanding or monotonous work and can concentrate optimally on the attendance, adjustment and control of functioning of the apparatus.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENT

Figure 1:
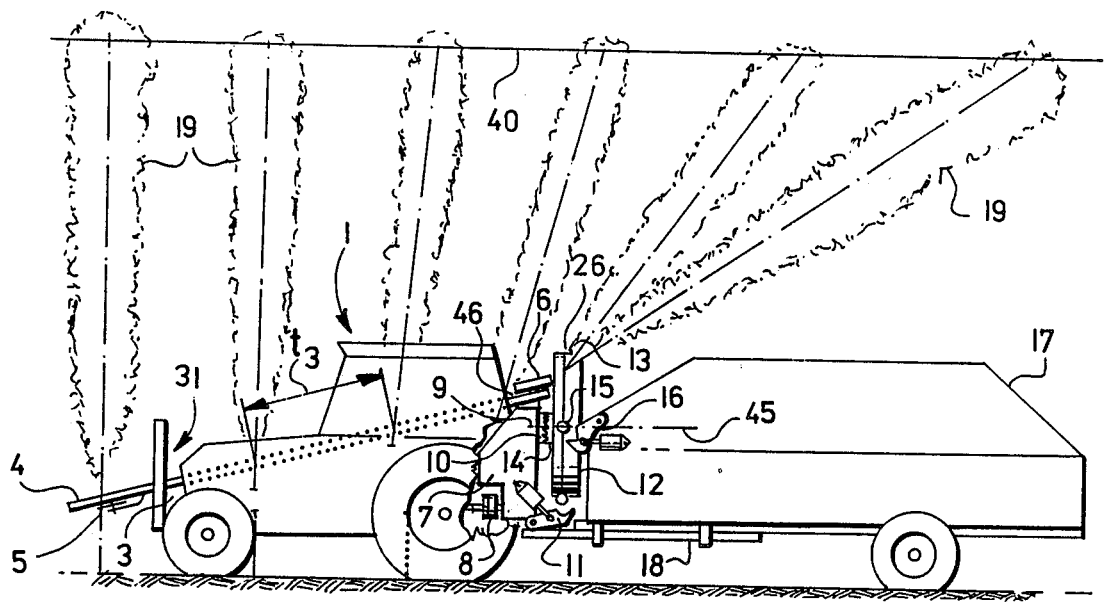
FIG. 1 is a side view a trailing and conveying device at work in a hop garden.
Figure 2:
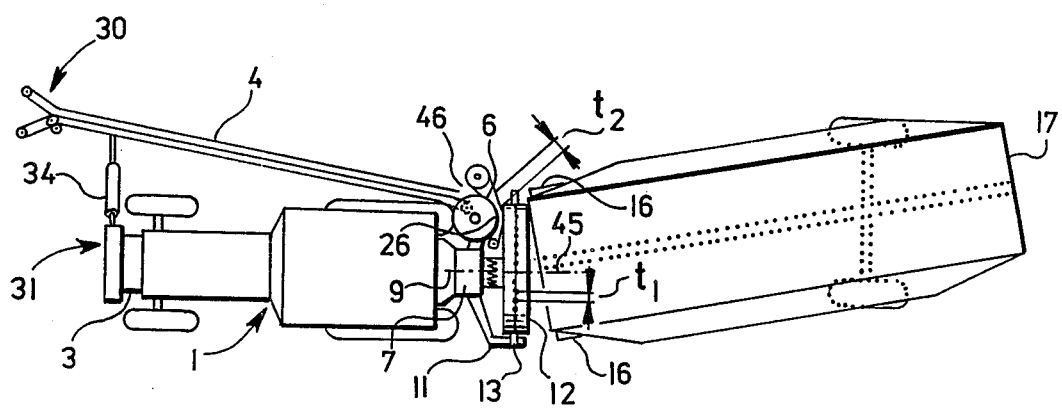
FIG. 2 is a top view of the apparatus as in FIG. 1.

With reference to FIGS. 1 and 2, an inclined conveyer 4 provided with a hop vine cutting device 5 are by means of a hoisting mechanism 31 and a frame 3 supported on a trailing device 1 and are adjustable as to their height. A tear-off conveyer 6 is fixed on the frame 3 (FIG. 7) and a transmission gear 7 is fixed on the trailing device 1, said transmission gear 7 driven by way of a power take-off shaft 8 of the trailing device 1. In case of an alternative arrangement, the transmission gear 7 can be actuated by a hydraulic drive (not shown). The transmission gear 7 is provided on its outlet shaft 9 with a driving element 10, for example with engaging teeth as shown in the drawing.

In its first operating position indicated in FIGS. 1 and 2, i.e. in a position corresponding to its working in the hop garden, a displaceable rotary storage device 12 of hop vines with retaining means 13 is connected by clamping means 11 to the frame 3 or to the transmission gear 7 in such a way that the driving element 10 is in engagement with a driven counterpart 14 arranged coaxially on a main shaft 15 of the displaceable rotary storage device 12. In this first operating position, clamps 16 arranged on the conveying device 17 are not active, the adjustable frame 18 of the conveying device 17 is adjusted in its position with reduced length set, and the axis 45 of the displaceable rotary storage device 12 is substantially horizontal.

Figure 3:
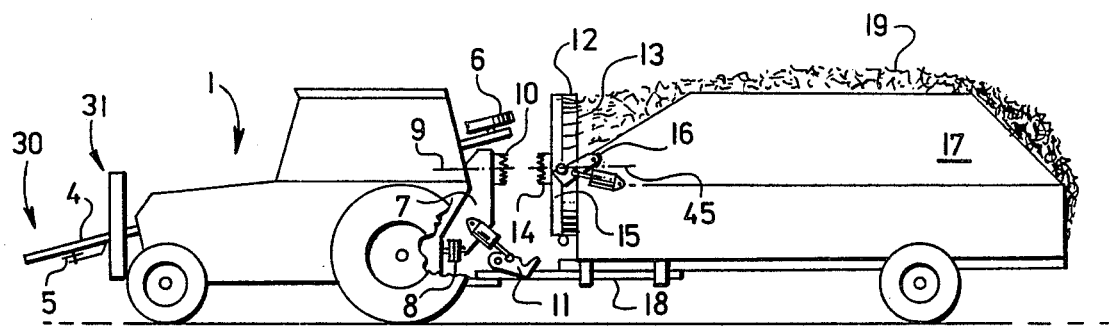
FIG. 3 is a side view of the trailing and conveying device in transport position.
Figure 4:
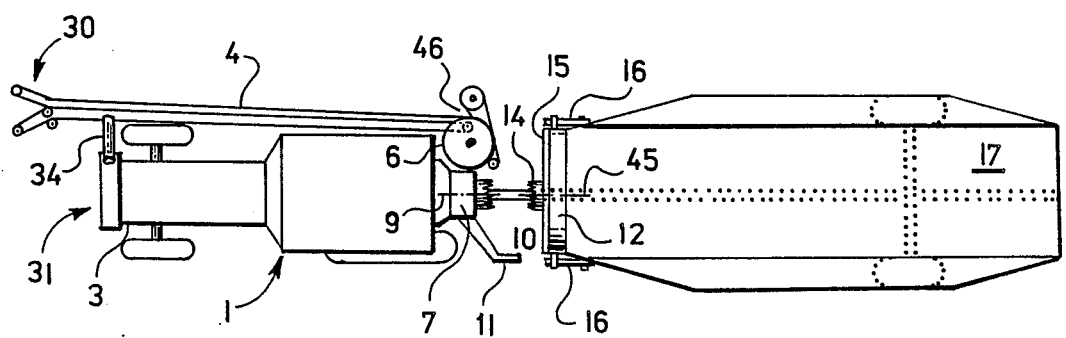
FIG. 4 is a top view of the apparatus from FIG. 3.

In a transport position indicated in FIGS. 3 and 4, i.e. in a position for transporting a conveying device 17 on roads, the displaceable rotary storage device 12 is connected by clamps 16 to the front part of the conveying device 17, the driven counterpart 14 on the main shaft 15 of the displaceable rotary storage device 12 is remote from its driving element 10 the clamping means 11 are disconnected and the adjustable frame 18 of the conveying device 17 is adjusted at its position with increased length set.

Figure 5:
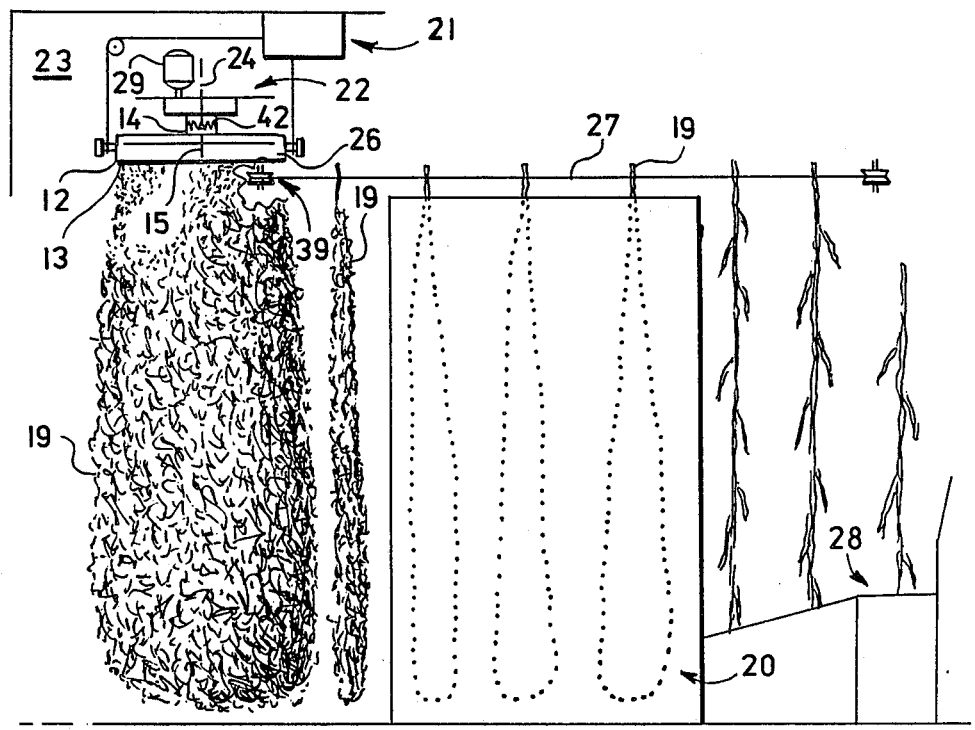
FIG. 5 is a side view of an intermediate storage device and of a dosing conveyor.
Figure 6:
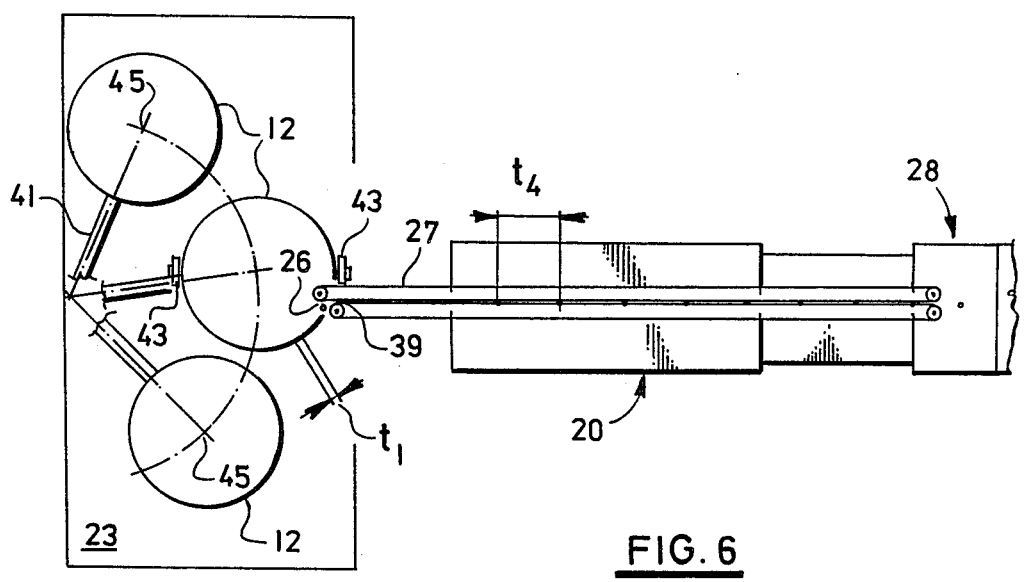
FIG. 6 is a top view of the apparatus from FIG. 5.

In a following operating position indicated in FIGS. 5 and 6, i.e. in a position corresponding to working of the apparatus when the hop vines 19 are prepared to be treated by the picking machine 20, the displaceable rotary storage device 12 with hop vines 19 clamped therein by retaining means 13 is connected by means of the hoisting device 21 to a driving device 22 with a driving motor 29 situated in the upper part of an intermediate storage device 23 so that the main shaft 15 of the displaceable rotary storage device 12 is coaxial with the vertical shaft 24 of the driving device 22 and the driven counterelement 14 is in engagement with the driving outlet 42. The proper fastening of the displaceable rotary storage device 12 is secured by clamps 43.

In this operating position, the hop vines 19 fixed by retaining means 13 on the displaceable rotary storage device 12 are freely suspended in a vertical position.

A dosing conveyer 27 is linked to the outlet 26 of the displaceable rotary storage device 12, which in this position fulfills the function of outlet means of hop vines 19, and feeds not yet picked hop vines 19 to a known picking machine 20 and transports the picked hop vines 19 to a vine cutter 28.

In the position indicated in FIG. 6, there are one or more displaceable rotary storage devices 12 with hop vines 19 stored in the intermediate storage device 23 to form an equalizing store of not yet picked hop vines, securing thus a smooth performance of the whole processing line and simultaneously also one or more already emptied displaceable rotary storage devices 12 which are prepared for returning to the conveying device 17.

Figures 7, 8:
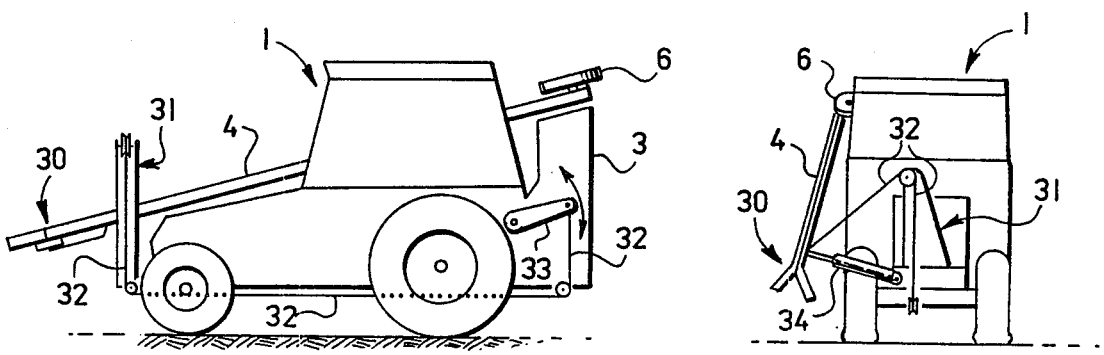
FIG. 7 is a side view of the trailing device with an apparatus for adjustment of the front part of an inclined conveyer.
FIG. 8 is a front view thereof, and FIGS. 9 through 17 indicate diagrammatically the functioning of the apparatus in the course of individual stages of its performance.

The inclined conveyer 4 as particularly apparent in FIGS. 7 and 8 is by its front part 30 connected both to the already mentioned vertically acting hoisting device 31 by way of for example cable 32 connected to the hoisting arrangement 33 of the trailing device 1 and also to a hydraulic cylinder 34 or the like controllable by the attendant or driver, whereby the hydraulic cylinder 34 is connected to the front part 30 of the inclined conveyer 4 and to the front part of the trailing device 1.

The operation of the apparatus according to this invention, including the cutting device, the tearing-off, transport and feeding of hop vines to the picking machine, is particularly shown in FIGS. 9 through 17 and proceeds as follows:

After the mobile set (that is the trailing device 1 with the inclined conveyer 4, the tear-off conveyer 6, the displaceable rotary storage device 12, and the conveying device 17) has arrived in the hop garden and after adjustment of the whole set to an approximately straight line, the conveying device 17 is adjusted by means of the adjustable frame 18 to a position with reduced length of the set and the displaceable rotary storage device 12 is by clamping means 11 and by the driven counterelement 14 and the driving element 10 connected to the trailing device 1 after it has been released by means of clamps 16 from the conveying device 17. The front part 30 of the inclined conveyer 4 is, by means of the hydraulic cylinder 34 and by means of the hoisting device 31, adjusted to a position suitable for harvesting a row of the product. This situation corresponds to FIG. 9.

After the set has started its operation, the hop vines 19 are cut off by the cutting device 5 and the cut-off end of the hop vine 19 is seized by the inclined conveyer 4 (see FIG. 10).

The cut-off part of the hop vine 19 is, by the inclined conveyer 4, brought close to the tear-off conveyor 6, while the upper part of the hop vine 19 remains fastened on its wire suspension 40 as indicated in FIG. 11.

Prior to releasing the hop vine 19 from the inclined conveyer 4, the hop vine 19 is engaged by the tear-off conveyer 6, the input 46 of which is above the level of the discharge of the seized hop vine 19 from the inclined conveyer 4, whereby the speed of the tear-off conveyer 6 in direction of advance of the set is substantially lower than the operating speed of the set. Due to the difference of those speeds the tearing-off of the upper part of the hop vine 19 from the wire suspension 40 is accomplished and the torn-off vines 19 fall freely on the conveying device 17 as indicated in FIG. 12. The place where the hop vine 19 is engaged by the tear-off conveyer 6 is above the place of the earlier seizure by the inclined conveyer 4 so that a solid and reliable seizure of the hop vine 19 is secured.

After tearing-off of the hop vine 19, its end is seized by retaining means 13 of the displaceable rotary storage device 12 and immediately thereafter it is released fro the tear-off conveyer 6 (see FIGS. 13 and 1). As the outlet of the tear-off conveyer 6 is arranged below the termination 26 of the displaceable rotary storage device 12, the hop vine 19 is seized by its retaining means 13 again on a hitherto not damaged, more highly situated contact place, whereby again a firm and reliable seizure of the hop vine 19 is secured. In the course of tearing-off of following hop vines 19 all earlier torn-off vines 19 remain fastened by retaining means 13 of the displaceable rotary storage device 12 whereby the configuration of hop vines 19 on the conveying device 17 has, due to the rotation of the displaceable rotary storage device 12 in the course of its filling, the shape of a longitudinal helical bundle.

After the displaceable rotary storage device 12 has been filled and the whole set has been straightened to an approximate linear direction, the displaceable rotary storage device 12 is, by means of clamps 16, fastened to the conveying device 17, and, by means of clamping means 1, simultaneously released from the trailing device 1, and the conveying device 17 is, by means of the elongated frame 18 transferred to its elongated condition as indicated in FIG. 14. Thus, the displaceable rotary storage device 12 and the conveying device 17 with the hop vines 19 are somewhat removed from the trailing device 1 and simultaneously the driving element 10 is disengaged from the driven counterpart 14 and the whole set is prepared to be moved to a stationary picking machine 20.

After the whole set has arrived at a stationary processing line to a place containing an intermediate storage device 23, a hoisting device 21 is started to operate after release of clamps 16, by means of which hoisting device 21 the displaceable rotary storage device 12 with the bundle of hop vines 19 is hoisted to the intermediate storage device 23 (see FIG. 15). After this full displaceable rotary storage device 12 has been properly secured in the intermediate storage device 23, an empty displaceable rotary storage device 12 from the space of the intermediate storage device 23 can be lowered to the emptied conveying device 17 and fixed by clamps 16. After this exchange of a full displaceable rotary storage device 12 for an empty one, the whole set returns to the hop garden for a new bundle of torn-off hop vines 19.

While mobile sets perform the above described operations, full displaceable rotary storage devices 12 in the intermediate storage device 23 (see FIG. 16) with freely suspended hop vines 19 are awaiting their emptying while the preceding one is emptied.

After release of the preceeding displaceable rotary storage device 12, a full displaceable rotary storage device 12 is shifted by means of a shifting device 41 (see FIGS. 5 and 6) into the neighborhood of the picking machine 20 into a position where the main shaft 15 of the displaceable rotary storage device 12 is coaxial with the vertical shaft 24 of the driving device 22 thereof. Thus, simultaneously the terminating part 26 of the displaceable rotary storage device 12 comes close to the inlet part 39 of the dosing and feeding conveyer 27 of the picking machine 20, however above its level.

By switching-in the motor 29, the displaceable rotary storage device 12 and simultaneously the dosing conveyer 27 start their movement as indicated in FIG. 17. The hop vines 19, up to now fastened by the retaining means 13 of the displaceable rotary storage device 12, are subsequently released and are simultaneously taken over by the dosing conveyer 27 which feeds them to the picking machine 20 where the hops are plucked from the hop vines 19 and the stripped vines are carried by the conveyer 27 to a vine cutter 28 (see FIGS. 5 and 6). The hop vines 19 are advantageously seized by the dosing conveyer 27 at an up to now not squeezed, i.e. not damaged place on the stalk, which is from the point of view of a reliable transport rather important. After the displaceable rotary storage device 12 has been emptied, said storage device 12 is replaced by another full storage device 12 and the whole cycle is repeated.

The adjustment of the described method and apparatus to conditions of the crop, i.e. to gathered varieties, productivity, condition, habitus and degree of ripeness of the product is enabled both as it is possible to adjust the working speed of the mobile set in the course of gathering the hop vines and it is also possible to adjust fro the place of the attendant a suitable position of the front part 30 of the inclined conveyer 4.

In order to secure a correct functioning of the apparatus is required that distances $t_1 < t_2 < t_3$ (FIGS. 1 and 2) for conditions where the inclined conveyer 4, the tear-off conveyer 6 and the displaceable rotary storage device 12 cooperating therewith are in operation; and that $t_1 \leq t_4$ (FIG. 6) for conditions where in the intermediate storage device 23 are in operation a just emptied displaceable rotary storage device 12 and the therewith cooperating dosing conveyer 27, whereby:

$t_1$ is the distance between hop vines 19 in the displaceable rotary storage device 12;

$t_2$ is the distance between hop vines 19 in the tear-off conveyer 6;

$t_3$ is the distance between hop vines 19 in the inclined conveyer 4; and $t_4$ is the distance between hop vines 19 in the dosing conveyer 27.

By changing the ratio of the operating speed of the inclined conveyer 4 and of the displaceable rotary storage device 12 it is possible to select the distance $t_1$ of hop vines 19 in the retaining means 13 of the displaceable rotary storage device 12 in the course of its filling and thus also the number of hop vines 19 in the displaceable rotary storage device 12; and by changing the working speed of the displaceable rotary storage device 12 in the course of its emptying, and by changing the working speed of the dosing conveyor 27, it is possible to adjust the performance of the picking machine 20 to the kind, condition and ripeness of the harvested product.

For a smooth operation, hop vines 19 should be gripped at a new point on their stalks each time they are transferred from one gripping means to another. Starting from their cutting from their roots up to their entrance into the picking machine 20, the vines 19 should be subsequently gripped at hitherto not damaged places on the stalk, which is in case of a repeated gripping at places progressively more distant from the initial place of cutting off.

If needed, it is possible to expose the hop vines 19 to conditioning while they are freely suspended in a vertical position in the displaceable rotary storage devices 12 in the space of the intermediate storage device 23, for example to moistening, airing and the like. Thus favourable conditions can be created for improvement of the quality of operation of th picking machine 20 and to the following separation of the product from waste.

The described method and apparatus are also suitable for gathering and processing of other products, particularly products of larger size which have to be transported prior to processing and which may require storage for some time prior to processing.

Although the invention is described and illustrated with reference to a preferred embodiment thereof, it is to be expressly understood that it is in no way limited to the disclosure of such preferred embodiment but is capable of numerous modifications within the scope of the appended claims.

I claim:

1. A method for gathering of hop vines comprising the steps of
    cutting a vine stalk close to its roots;
    seizing the stalk by an inclined conveyor at a first point on said stalk, said first point being near the cut end;
    transferring the stalk from the inclined conveyor to a tear-off conveyor, said tear-off conveyor seizing said stalk at a second point on said stalk, said second point being farther from the cut end than said first point;
    transferring the stalk from said tear-off conveyer to a rotary storage device, said rotary storage device seizing said stalk at a third point on said stalk, said third point being farther from said cut end than said second point;
    removably mounting said rotary storage device in a means for transport to a picking machine.

2. A method as claimed in claim 1, further comprising the steps of
    removing said rotary storage device from said transport means;
    removably mounting said rotary storage device in an intermediate storage position;
    transferring said stalk from said rotary storage device to said picking machine.

3. A method as claimed in claim 2, further comprising said picking machine being provided with a dosing conveyor;
    said transferring of said stalk from said rotary storage device to said picking machine, being accomplished by transferring said stalk from said rotary storage device to said dosing conveyor, said dosing conveyor seizing said stalk at a fourth point on said stalk, said fourth point being farther from said cut end than said third point.

4. A method as claimed in claim 3 further comprising
said step of cutting said stalk being repeated for a plurality of stalks;
said step of seizing said stalk by an inclined conveyor being repeated for each of said plurality of stalks, each of said plurality of stalks travelling on said inclined conveyor separated from each other by first distance;
said step of transferring the stalk from the inclined conveyor to a tear-off conveyor being repeated for each of said plurality of stalks travelling on said inclined conveyor, said transferred stalks then travelling on said tear-off conveyor separated from each other by a second distance, said second distance being smaller than said first distance;
said step of transferring the stalk from said tear-off conveyer to a rotary storage device being repeated for each of said plurality of stalks travelling on said tear-off conveyor, said transferred stalks then travelling on said rotary storage device separated from each other by a third distance, said third distance being smaller than said second distance;
said step of transferring said stalk from said rotary storage device to said dosing conveyor being repeated for each of said plurality of stalks travelling on said rotary storage device, said transferred stalks then travelling on said dosing conveyor separated from each other by a fourth distance, said fourth distance being greater than or equal to said third distance.

5. An apparatus for gathering of hop vines comprising
a mobile set and a stationary set;
said mobile set comprising a trailing device, a conveying device, and a removable rotary storage device, said rotary storage device having an axis of rotation;
said trailing device being provided with a cutting device, an inclined conveyer cooperating with said cutting device, a tear-off conveyor cooperating with said inclined conveyor and means for removably mounting said rotary storage device in a position where said axis of rotation is substantially horizontal, and means for rotating said rotary storage device about said axis of rotation, whereby when said rotary storage device is so mounted and rotated it cooperates with said tear-off conveyor;
said conveying device being adapted for transporting hop vines to said stationary set and including means for removably mounting said rotary storage device in a position where said axis of rotation is substantially horizontal;
said stationary set comprising an intermediate storage device and a cooperating dosing conveyer for a picking machine;
said intermediate storage device being provided with means for removably mounting said rotary storage device in a position where said axis of rotation is substantially vertical.

6. An apparatus as claimed in claim 5 further comprising
said inclined conveyor, tear-off conveyor, and dosing conveyor each having an inlet and an outlet;
said rotary storage device having an inlet/outlet;
the inlet of the tear-off conveyer being located above the level of the outlet of the inclined conveyor;
the inlet/outlet of the rotary storage device being located above the level of the outlet of the tear-off conveyor;
the inlet of the dosing conveyer being located below the level of the inlet/outlet of the rotary storage device.

7. An apparatus as claimed in claim 5 further comprising
said intermediate storage device being provided with means for rotating said rotary storage device about said axis of rotation.

8. An apparatus as claimed in claim 5 further comprising
said inclined conveyor being movable horizontally and vertically with respect to said trailing device.

9. An apparatus as claimed in claim 8 where a front part of the inclined conveyer is in mechanical engagement with a hoisting device of the trailing device and where a hydraulic cylinder is provided between the front part of the inclined conveyer and the trailing device.

* * * * *